United States Patent
Ashkar et al.

(10) Patent No.: US 10,198,849 B1
(45) Date of Patent: Feb. 5, 2019

(54) PRELOADING TRANSLATION AND DATA CACHES USING ON-CHIP DMA ENGINE WITH FAST DATA DISCARD

(71) Applicant: Advanced Micro Devices, Inc., Sunnyvale, CA (US)

(72) Inventors: Alexander Fuad Ashkar, Winter Park, FL (US); Rex Eldon McCrary, Oviedo, FL (US); Harry J. Wise, Chuluota, FL (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 15/794,344

(22) Filed: Oct. 26, 2017

(51) Int. Cl.
| | |
|---|---|
| *G06T 1/60* | (2006.01) |
| *G06T 15/00* | (2011.01) |
| *G06F 12/0811* | (2016.01) |
| *G06F 12/1027* | (2016.01) |
| *G06F 12/1009* | (2016.01) |
| *G06F 12/1081* | (2016.01) |
| *G09G 5/39* | (2006.01) |

(Continued)

(52) U.S. Cl.
CPC ........ *G06T 15/005* (2013.01); *G06F 12/0811* (2013.01); *G06F 12/1009* (2013.01); *G06F 12/1027* (2013.01); *G06F 12/1081* (2013.01); *G06F 13/28* (2013.01); *G06T 1/60* (2013.01); *G09G 5/363* (2013.01); *G09G 5/39* (2013.01); *G06F 2212/283* (2013.01); *G06F 2212/65* (2013.01); *G06F 2212/68* (2013.01); *G06T 2200/28* (2013.01); *G09G 2360/10* (2013.01); *G09G 2360/121* (2013.01); *G09G 2360/18* (2013.01)

(58) Field of Classification Search
CPC ..... G06T 15/005; G06T 2200/28; G06T 1/60; G06F 12/0811; G06F 12/1027; G06F 12/1009; G06F 12/1081; G06F 13/28; G06F 2212/65; G06F 2212/283; G09G 2360/121; G09G 5/39; G09G 5/363; G09G 2360/10; G09G 2360/18
See application file for complete search history.

(56) References Cited

U.S. PATENT DOCUMENTS

| | | | |
|---|---|---|---|
| 5,774,684 A * | 6/1998 | Haines | G06F 11/3652 710/305 |
| 9,110,810 B2 | 8/2015 | Wang et al. | |
| 10,043,235 B2 | 8/2018 | Kim et al. | |

(Continued)

*Primary Examiner* — Robert J Craddock
(74) *Attorney, Agent, or Firm* — Meyertons Hood Kivlin Kowert and Goetzel PC; Rory D. Rankin

(57) ABSTRACT

Systems, apparatuses, and methods for preloading caches using a direct memory access (DMA) engine with a fast discard mode are disclosed. In one embodiment, a processor includes one or more compute units, a DMA engine, and one or more caches. When a shader program is detected in a sequence of instructions, the DMA engine is programmed to utilize a fast discard mode to prefetch the shader program from memory. By prefetching the shader program from memory, the one or more caches are populated with address translations and the shader program. Then, the DMA engine discards the shader program rather than writing the shader program to another location. Accordingly, when the shader program is invoked on the compute unit(s), the shader program and its translations are already preloaded in the cache(s).

20 Claims, 5 Drawing Sheets

(51) Int. Cl.
*G09G 5/36* (2006.01)
*G06F 13/28* (2006.01)

(56) References Cited

U.S. PATENT DOCUMENTS

| | | | |
|---|---|---|---|
| 10,121,220 B2 | 11/2018 | Bolz | |
| 2007/0260446 A1* | 11/2007 | Suba | G06F 9/45537 |
| | | | 703/25 |
| 2007/0285287 A1* | 12/2007 | Hussain | H03M 7/40 |
| | | | 341/50 |

* cited by examiner

PRELOADING TRANSLATION AND DATA CACHES USING ON-CHIP DMA ENGINE WITH FAST DATA DISCARD

BACKGROUND

Description of the Related Art

A graphics-processing unit (GPU) is a complex integrated circuit that is adapted to perform graphics-processing tasks. A GPU can execute graphics-processing tasks required by an end-user application, such as a video-game application. The graphics-processing tasks performed by GPUs typically involve complex mathematical computations, such as matrix and vector operations. To efficiently perform these computations, GPUs typically include an array of processing elements, called a shader engine. A shader engine executes a sequence of instructions, called a shader program. With the rapid increase of processing capability in the GPU, more effective means of fully utilizing the available computing power of the GPU are desired.

BRIEF DESCRIPTION OF THE DRAWINGS

The advantages of the methods and mechanisms described herein may be better understood by referring to the following description in conjunction with the accompanying drawings, in which.

DETAILED DESCRIPTION OF EMBODIMENTS

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Various systems, apparatuses, methods, and computer-readable mediums for implementing a DMA engine in fast discard mode are disclosed herein. In one embodiment, a system includes at least a processor and a memory coupled to the processor. In one embodiment, the processor is a graphics processing unit (GPU). In other embodiments, the processor can be other types of processors (e.g., application specific integrated circuit (ASIC), field programmable gate array (FPGA), digital signal processor (DSP)).

In one embodiment, the processor includes a command processor, one or more compute units, and one or more caches. The command processor includes at least a prefetching engine, a draw engine, and a direct memory access (DMA) engine. Prior to executing a shader program, the prefetching engine is configured to program the DMA engine to prefetch the shader program using a fast discard mode. When the DMA engine prefetches the shader program from memory, the one or more caches are populated with address translations and data for the shader program. Since the DMA engine is in the fast discard mode, rather than writing the shader program to another location, the DMA engine discards the shader program after the one or more caches are populated. When the draw engine initiates the shader program on the compute unit(s), the shader program will experience hits in the cache(s) due to the preloading of translations and data. This reduces the latency typically involved in invoking the shader program.

Figure 1:
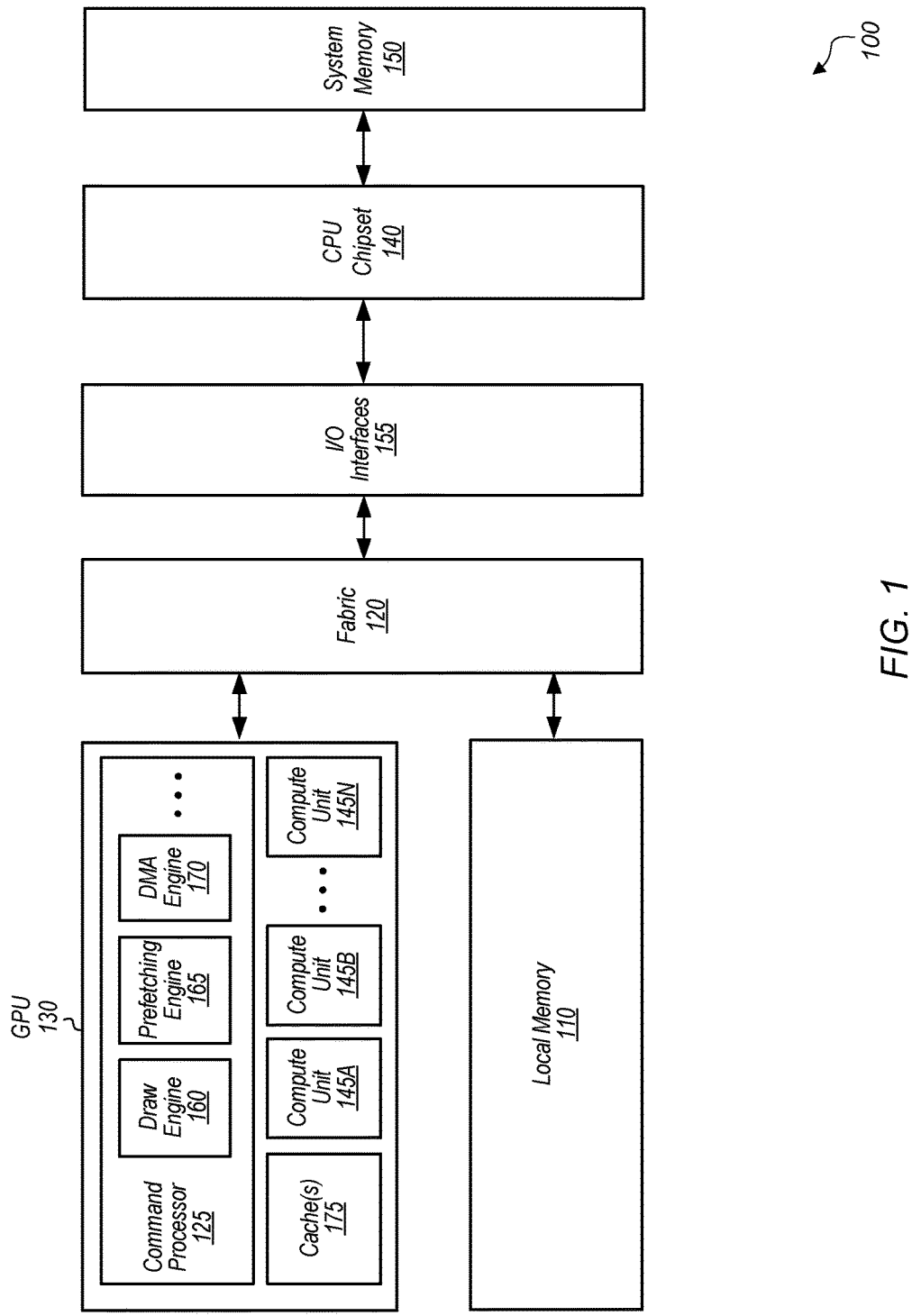
FIG. 1 is a block diagram of one embodiment of a computing system.

Referring now to FIG. 1, a block diagram of one embodiment of a computing system 100 is shown. In one embodiment, computing system 100 includes a system memory 150, input/output (I/O) interfaces 155, fabric 120, graphics processing unit (GPU) 130, local memory 110, and central processing unit (CPU) Chipset 140. System 100 can also include other components not shown in FIG. 1 to avoid obscuring the figure. In another embodiment, GPU 130 can be another type of processing unit (e.g., application specific integrated circuit (ASIC), field programmable gate array (FPGA), digital signal processor (DSP)). Additionally, it should be understood that other types of computing systems with different structures and/or containing other components can be utilized to implement the various methods and mechanisms described herein.

GPU 130 includes at least command processor 125, compute units 145A-N, and cache(s) 175. Cache(s) 175 include one or more of a data cache, instruction cache, address translation cache, including multiple levels of each type of cache. Compute units 145A-N are representative of any number and type of compute units that are used for graphics or general-purpose processing. Each compute unit 145A-N includes any number of execution units, with the number of execution units varying from embodiment to embodiment. Each compute unit 145A-N can also be referred to as a shader engine.

GPU 130 is coupled to local memory 110 via fabric 120. In one embodiment, local memory 110 is implemented using high-bandwidth memory (HBM). In one embodiment, GPU 130 is configured to execute graphics pipeline operations such as draw commands, pixel operations, geometric computations, and other operations for rendering an image to a display. In another embodiment, GPU 130 is configured to execute operations unrelated to graphics. In a further embodiment, GPU 130 is configured to execute both graphics operations and non-graphics related operations.

In one embodiment, command processor 125 controls the processing of instructions performed by GPU 130. For example, command processor 125 receives instructions from a CPU (not shown), and command processor 125 coordinates the execution of those instructions on GPU 130. In some embodiments, command processor 125 generates one or more commands, corresponding to each received command, to be executed on GPU 130.

Command processor 125 includes a plurality of sub-processor engines including draw engine 160, prefetching engine 165, and DMA engine 170. In other embodiments, command processor 125 can include other numbers and types of sub-processor engines. Prefetching engine 165 is configured to perform latency hiding functions to assist draw engine 160 by prefetching data. For example, prefetching engine 165 is configured to fetch state commands, draw commands, dispatch commands and/or other types of commands from cache or memory. Prefetching engine 165 is configured to process and parse the retrieved commands, and then provide state updates, draw packets, dispatch packets, and/or other types of packets to draw engine 160. Draw engine 160 is configured to process the state update, dispatch, and draw packets. For example, draw engine 160 issues draw packets to draw initiators which perform various rendering tasks.

In one embodiment, command processor 125 is configured to initiate prefetching of a pending shader program prior to execution of the shader program. Prefetching engine 165 programs DMA engine 170 to implement a fast discard mode to prefetch the shader program from memory, either local memory 110 or system memory 150. When DMA engine 170 prefetches the shader program from memory, the shader program and its translations will populate cache(s) 175. Since DMA engine 170 is in the fast discard mode, once the shader program has been read from memory, which causes cache(s) 175 to be populated, the shader program is discarded rather than being written to another location. Later, when draw engine 160 issues a command to compute units 145A-N to invoke the shader program, lookups of the cache(s) 175 for the shader program will result in hits. This helps to reduce the latency of invoking the shader program. In one embodiment, multiple shader programs can be prefetched simultaneously by DMA engine 170 in the fast discard mode, reducing the latency of invoking multiple shader programs.

I/O interfaces 155 are coupled to fabric 120, and I/O interfaces 155 are representative of any number and type of interfaces (e.g., PCI bus, PCI-Extended (PCI-X), PCIE (PCI Express) bus, gigabit Ethernet (GBE) bus, universal serial bus (USB)). CPU chipset 140 is coupled to system memory 150, which includes one or more memory modules. Each of the memory modules includes one or more memory devices mounted thereon. In some embodiments, system memory 150 includes one or more memory devices mounted on a motherboard or other carrier upon which GPU 130 and/or other components are also mounted.

In various embodiments, computing system 100 can be a computer, laptop, mobile device, server or any of various other types of computing systems or devices. It is noted that the number of components of computing system 100 and/or GPU 130 can vary from embodiment to embodiment. There can be more or fewer of each component/subcomponent than the number shown in FIG. 1. It is also noted that computing system 100 and/or GPU 130 can include other components not shown in FIG. 1. Additionally, in other embodiments, computing system 100 and GPU 130 can be structured in other ways than shown in FIG. 1.

Figure 2:
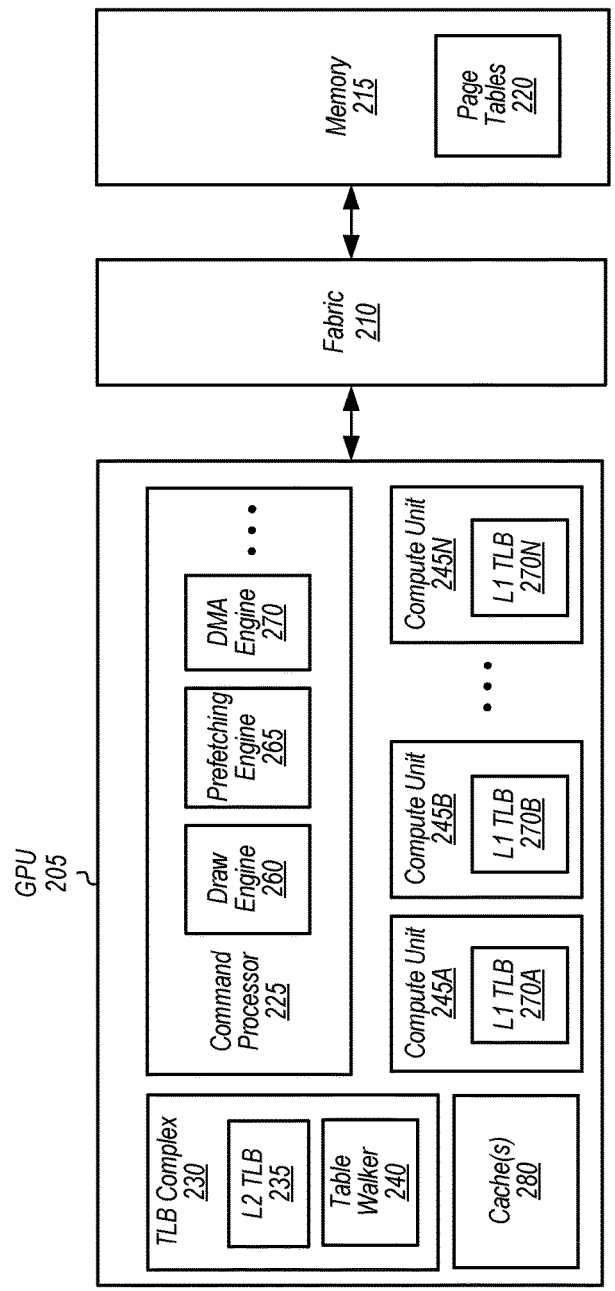
FIG. 2 is a block diagram of one embodiment of a graphics processing unit (GPU).

Turning now to FIG. 2, a block diagram of one embodiment of a graphics processing unit (GPU) 205 is shown. GPU 205 includes at least command processor 225, translation lookaside buffer (TLB) complex 230, compute units 245A-N, and cache(s) 280. In one embodiment, GPU 205 is coupled to memory 215 via fabric 210, with memory 215 representative of any number and type of memory devices.

In one embodiment, draw engine 260 is configured to invoke a first shader program on one or more of compute units 245A-N to process pixel data. While the first shader program is processing pixel data, a second shader program is identified in the subsequent application code. In response to receiving an indication of the pending second shader program, prefetching engine 265 is configured to program DMA engine 270 into fast discard mode to prefetch the second shader program. Accordingly, DMA engine 270 prefetches the second shader program, which causes cache(s) 280 and L2 TLB 235 to be populated with data and translations of the second shader program. Cache(s) 280 include any number of levels (e.g., L1, L2) of a cache hierarchy, with the structure of the cache hierarchy varying from embodiment to embodiment.

Once prefetching engine 265 programs DMA engine 270 to prefetch the second shader program in a discard mode, prefetching engine 265 continues to run in parallel with DMA engine 270. If DMA engine 270 does not complete before draw engine 260 invokes the second shader program, the second shader program could experience cache misses waiting on DMA engine 270 to populate cache(s) 280 and L2 TLB 235. DMA engine 270 not completing prior to draw engine 260 invoking the second shader program can be caused by (1) a queue of multiple DMA requests delaying the start of DMA engine 270, (2) a large size of the second shader program, (3) a small number of commands between the DMA command and the draw/dispatch command, or any combination of these three causes. When this race condition occurs, the second shader performance will only benefit for the cache lines DMA engine 270 prefetched and discarded before the second shader program requested them. For the cache lines the second shader program requested first, DMA engine 270 will benefit with a cache hit.

In one embodiment, GPU 205 uses TLBs to cache mappings of virtual addresses to physical addresses for the virtual addresses that are allocated to different shader programs. These TLBs are shown as L1 TLBs 270A-N in compute units 245A-N, respectively, and L2 TLB 235 in TLB complex 230. TLB complex 235 also includes table walker 240. In some embodiments, different TLBs can be implemented within GPU 205 for instructions or data. For example, a relatively small and fast L1 TLB 270 is backed up by a larger L2 TLB 235 that requires more cycles to perform a lookup. Some embodiments of a TLB complex include an instruction TLB (ITLB), a level one data TLB (L1 DTLB), and a level two data TLB (L2 DTLB). Other embodiments of a TLB complex can include other configurations and/or levels of TLBs.

In one embodiment, prefetching the second shader program will cause requests for virtual address translations to be conveyed to L2 TLB 235. If a request for the virtual address translation misses in the L2 TLB 235, then a page table walk is performed for the request. A page table walk can result in one or more lookups to the page table hierarchy. Translations of the second shader program will be retrieved from page tables 220 and cached in L2 TLB 235 as a result of these page table walks. After the second shader program has been prefetched, DMA engine 270 discards the second shader program rather than writing it to another location.

After the caches (e.g., cache(s) 280, L2 TLB 235) have been populated with translations and the second shader program as a result of DMA engine 270 prefetching the second shader program in fast discard mode, the second shader program is issued for execution to one or more of compute units 245A-N. During execution of the second shader program, a request for a virtual address translation for the second shader program will be posted to a L1 TLB 270. The L1 TLB 270 returns a physical address if the virtual address is found in an entry of the L1 TLB 270. If the request for the virtual address translation misses in the L1 TLB 270, then the request is posted to the L2 TLB 235. Since the second shader program was prefetched by prefetching engine 265, L2 TLB 235 will be populated with translations for the second shader program, resulting in hits for these translations when the second shader program is actually invoked.

Figure 3:
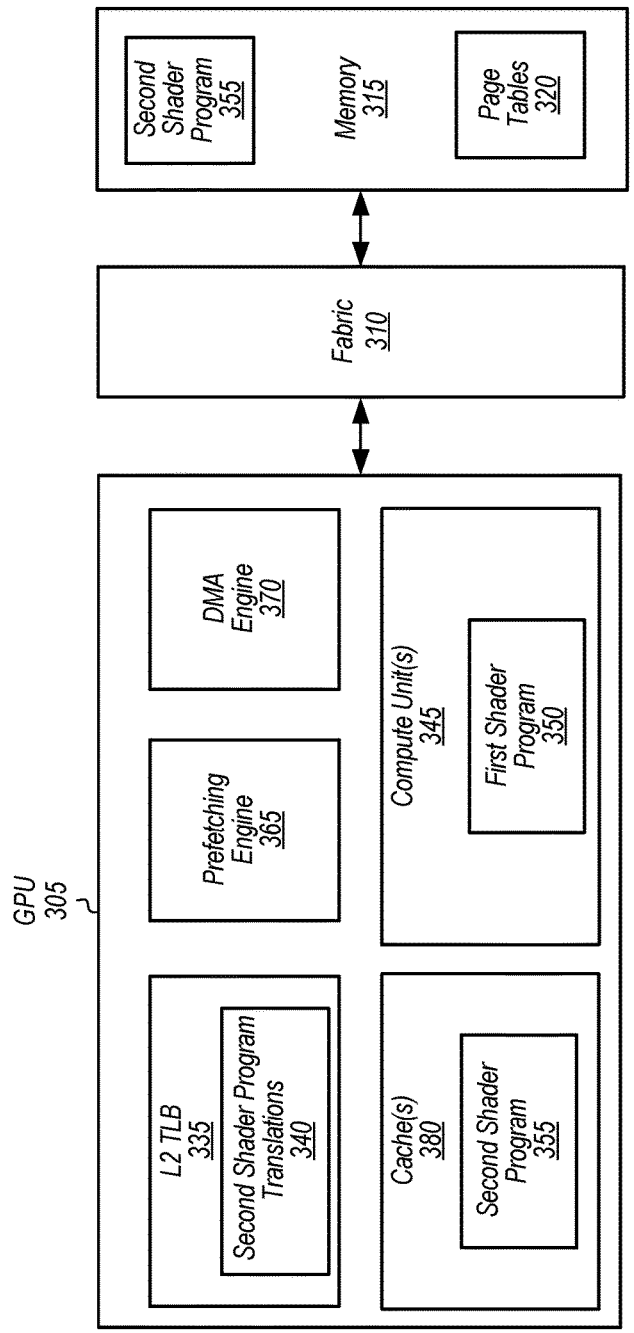
FIG. 3 is a block diagram of another embodiment of a GPU.

Referring now to FIG. 3, a block diagram of another embodiment of a GPU 305 is shown. GPU 305 includes at least compute unit(s) 345, L2 TLB 335, prefetching engine 365, DMA engine 370, and cache(s) 380. It is noted that GPU 305 can include other components which are not shown to avoid obscuring the figure. GPU 305 is coupled to memory 315 via fabric 310. It is assumed for the purposes of this embodiment that GPU 305 has issued first shader program 350 to compute unit(s) 345. While first shader program 350 executes on compute unit(s) 345, GPU 305 detects a subsequent shader program which has not yet been issued to compute unit(s) 345. This subsequent shader program is shown as second shader program 355 in memory 315. To reduce the latency associated with initiating execution of second shader program 355 on compute unit(s) 345, GPU 305 programs DMA engine 370 to prefetch second shader program 355 from memory 315. In one embodiment, GPU 305 programs DMA engine 370 in fast discard mode, causing DMA engine 370 to discard second shader program 355 rather than writing second shader program 355 to another location.

As part of the prefetching process implemented by DMA engine 370, virtual addresses of second shader program 355A will be translated into physical addresses. These address translations will be retrieved from page tables 320 and stored in L2 TLB 335. These address translations are shown as second shader program translations 340 in L2 TLB 335. Additionally, the prefetching process implemented by DMA engine 370 will involve caching second shader program 355 in cache(s) 380. The translations 340 and data 385 will then be available at a later point in time when second shader program 355 is invoked on compute unit(s) 345, helping to reduce the latency of launching second shader program 355. It is noted that these actions will be performed in parallel with compute unit(s) 345 processing pixel data with first shader program 350. Accordingly, when first shader program 350 is finished processing pixel data, compute unit(s) 345 can invoke second shader program 355 and lookups to L2 TLB 335 will result in hits to translations 340 and lookups to cache(s) 380 will result in hits to second shader program 355.

Figure 4:
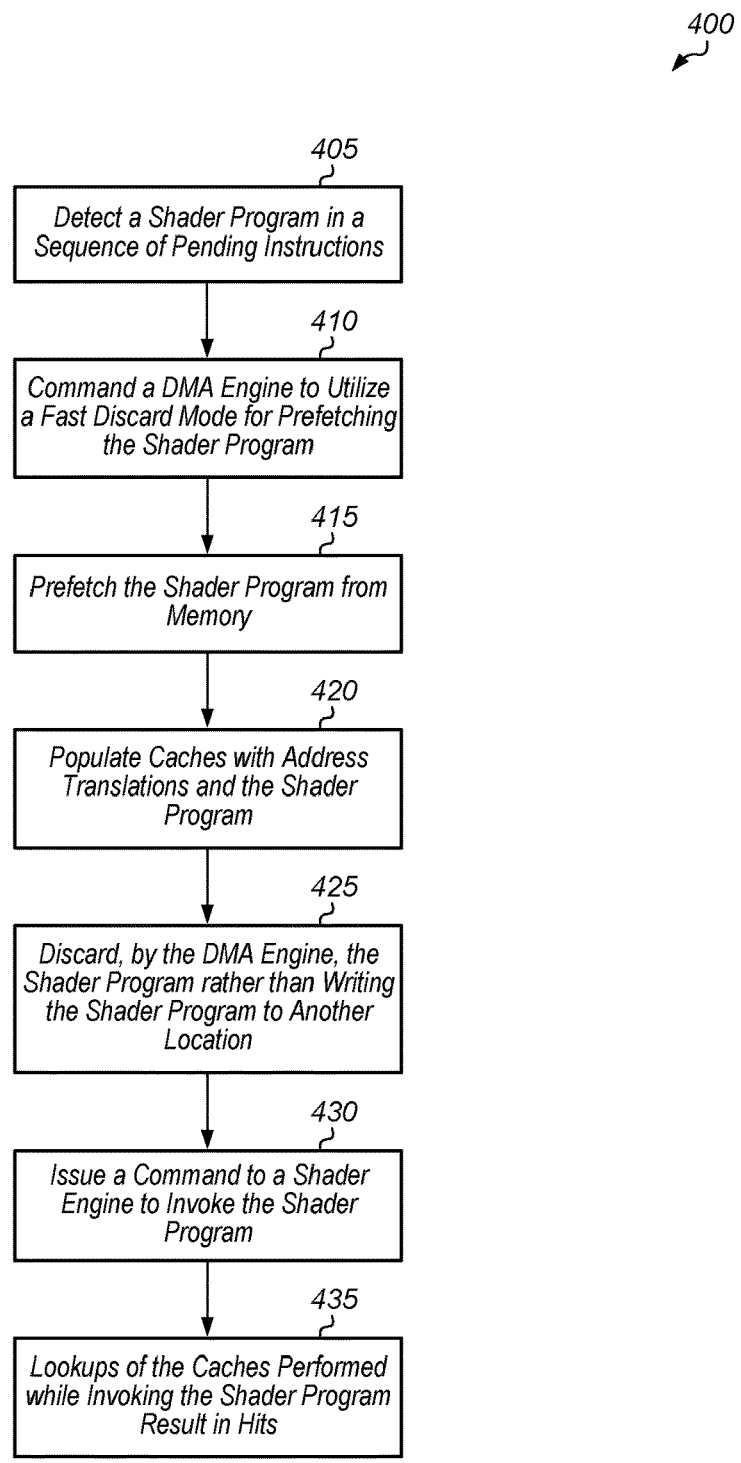
FIG. 4 is a generalized flow diagram illustrating one embodiment of a method for utilizing a DMA engine in fast discard mode.
Figure 5:
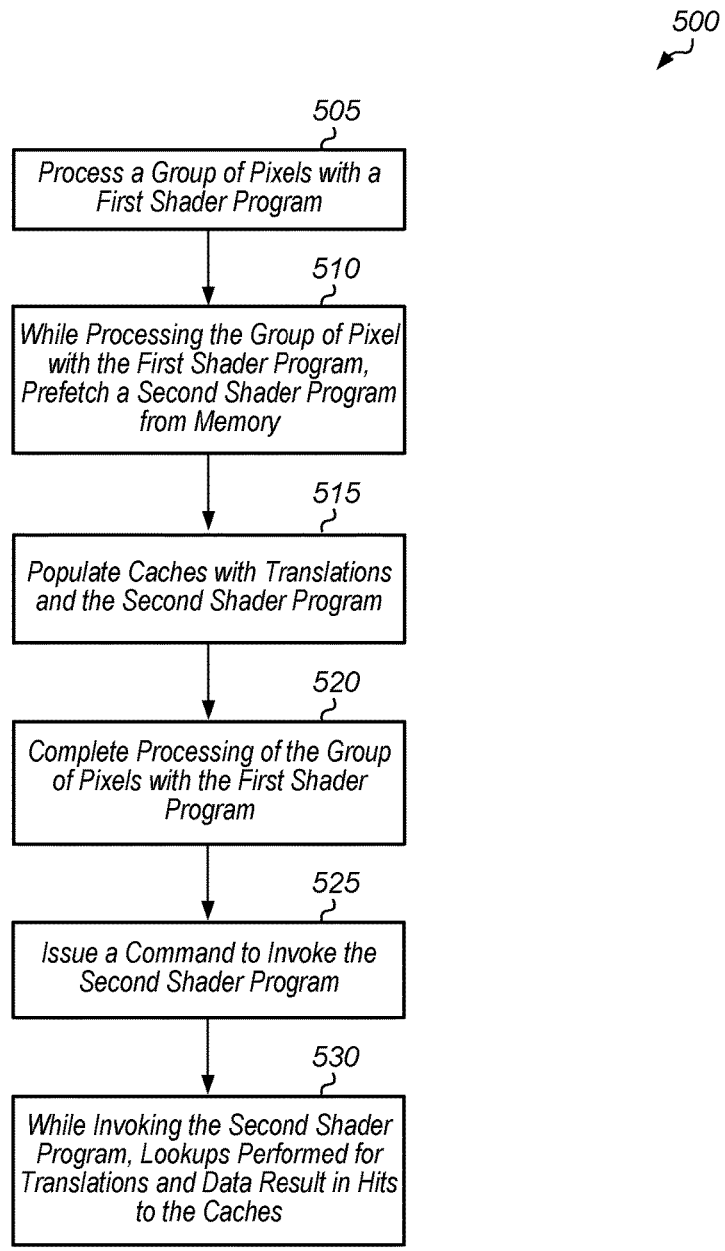
FIG. 5 is a generalized flow diagram illustrating another embodiment of a method for reducing the latency of a shader program.

Turning now to FIG. 4, one embodiment of a method 400 for implementing a fast discard mode for a DMA engine is shown. For purposes of discussion, the steps in this embodiment and those of FIG. 5 are shown in sequential order. However, it is noted that in various embodiments of the described methods, one or more of the elements described are performed concurrently, in a different order than shown, or are omitted entirely. Other additional elements are also performed as desired. Any of the various systems or apparatuses described herein are configured to implement method 400.

A shader program is detected in a sequence of pending instructions (block 405). In one embodiment, a graphics driver detects the shader program in a graphics application being executed. In response to the shader program being detected, a command processor commands a DMA engine to utilize a fast discard mode for prefetching the shader program (block 410). Next, the DMA engine prefetches the shader program from memory (block 415). As part of prefetching the shader program from memory, caches are populated with address translations and the shader program (block 420). For example, in one embodiment, a data cache is populated with the shader program and a translation lookaside buffer (TLB) is populated with address translations for the shader program. Then, the shader program is discarded by the DMA engine rather than writing the shader program to another location (block 425).

Next, a command is issued to a shader engine to invoke the shader program (block 430). A shader engine includes one or more compute units (e.g., compute units 145A-N of FIG. 1). Then, lookups of the one or more caches performed while invoking the shader program result in hits (block 435). After block 435, method 400 ends. In some embodiments, method 400 can be performed multiple times to prefetch multiple shader programs.

Referring now to FIG. 5, one embodiment of a method 500 for reducing latency of a shader program is shown. A GPU processes a group of pixels with a first shader program (block 505). While processing the group of pixels with the first shader program, the GPU prefetches a second shader program from memory (block 510). The GPU populates caches with translations and the second shader program (block 515). In one embodiment, the GPU utilizes a DMA engine in fast discard mode to populate the caches with the second shader program. At a later point in time, the GPU completes processing of the group of pixels with the first shader program (block 520). Next, the GPU issues a command to invoke the second shader program (block 525). For example, a command processor issues a command to the graphics pipeline to load the second shader program in one or more pipeline stages. While invoking the second shader program, lookups performed for translations and data result in hits to the caches (block 530). After block 530, method 500 ends.

In various embodiments, program instructions of a software application are used to implement the methods and/or mechanisms described herein. For example, program instructions executable by a general or special purpose processor are contemplated. In various embodiments, such program instructions can be represented by a high level programming language. In other embodiments, the program instructions can be compiled from a high level programming language to a binary, intermediate, or other form. Alternatively, program instructions can be written that describe the behavior or design of hardware. Such program instructions can be represented by a high-level programming language, such as C. Alternatively, a hardware design language (HDL) such as Verilog can be used. In various embodiments, the program instructions are stored on any of a variety of non-transitory computer readable storage mediums. The storage medium is accessible by a computing system during use to provide the program instructions to the computing system for program execution. Generally speaking, such a computing system includes at least one or more memories and one or more processors configured to execute program instructions.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A system comprising:
a direct memory access (DMA) engine;
one or more compute units; and
one or more caches;
wherein the system is configured to:
invoke a first shader program on the one or more compute units to process a group of pixels;

prior to completing processing of the group of pixels by the first shader program, program the DMA engine to prefetch a second shader program in discard mode; and prior to invoking the second shader program, discard, by the DMA engine, the second shader program after populating the one or more caches with address translations and the second shader program.

2. The system as recited in claim 1, wherein the system is further configured to issue a command to invoke the second shader program on the one or more compute units to process the group of pixels subsequent to populating the one or more caches with address translations and data of the second shader program.

3. The system as recited in claim 2, wherein the system is further configured to perform lookups to the one or more caches in response to invoking the second shader program.

4. The system as recited in claim 3, wherein the system is further configured to generate hits on lookups performed to the one or more caches in response to invoking the second shader program.

5. The system as recited in claim 1, wherein the one or more caches comprise a data cache and a translation lookaside buffer (TLB).

6. The system as recited in claim 5, wherein the system is configured to populate a level two (L2) TLB with address translations of the second shader program prior to invoking the second shader program on the one or more compute units.

7. The system as recited in claim 6, wherein each compute unit of the one or more compute units comprises a level one (L1) TLB.

8. A method comprising:
invoking a first shader program on one or more compute units to process a group of pixels;
prior to completing processing of the group of pixels by the first shader program, programming a DMA engine to prefetch a second shader program in discard mode; and
prior to invoking the second shader program, discarding, by the DMA engine, the second shader program after populating the one or more caches with address translations and the second shader program.

9. The method as recited in claim 8, further comprising issuing a command to invoke the second shader program on the one or more compute units to process the group of pixels subsequent to populating the one or more caches with address translations and data of the second shader program.

10. The method as recited in claim 9, further comprising performing lookups to the one or more caches in response to invoking the second shader program.

11. The method as recited in claim 10, further comprising generating hits on lookups performed to the one or more caches in response to invoking the second shader program.

12. The method as recited in claim 8, wherein the one or more caches comprise a data cache and a translation lookaside buffer (TLB).

13. The method as recited in claim 12, further comprising populating a level two (L2) TLB with address translations of the second shader program prior to invoking the second shader program on the one or more compute units.

14. The method as recited in claim 13, wherein each compute unit of the one or more compute units comprises a level one (L1) TLB.

15. An apparatus comprising:
a direct memory access (DMA) engine; and
one or more caches;
wherein the apparatus is configured to:
invoke a first shader program on one or more compute units to process a group of pixels;
prior to completing processing of the group of pixels by the first shader program, program the DMA engine to prefetch a second shader program in discard mode;
prior to invoking the second shader program, discard, by the DMA engine, the second shader program after populating the one or more caches with address translations and the second shader program.

16. The apparatus as recited in claim 15, wherein the apparatus is configured to issue a command to invoke the second shader program on the one or more compute units to process the group of pixels subsequent to populating the one or more caches with address translations and data of the second shader program.

17. The apparatus as recited in claim 16, wherein the apparatus is further configured to perform lookups to the one or more caches in response to invoking the second shader program.

18. The apparatus as recited in claim 17, wherein the apparatus is further configured to generate hits on lookups performed to the one or more caches in response to invoking the second shader program.

19. The apparatus as recited in claim 15, wherein the one or more caches comprise a data cache and a translation lookaside buffer (TLB).

20. The apparatus as recited in claim 19, wherein the apparatus is further configured to populate a level two (L2) TLB with address translations of the second shader program prior to invoking the second shader program on the one or more compute units.

* * * * *